(12) United States Patent
Rodriguez et al.

(10) Patent No.: US 11,003,545 B2
(45) Date of Patent: May 11, 2021

(54) USER SPACE INCREMENTAL TRACKING APPARATUSES, METHODS AND SYSTEMS

(71) Applicant: Datto Inc., Norwalk, CT (US)

(72) Inventors: Faury Francisco Rodriguez, Norwalk, CT (US); Jess Gentner, Rochester, NY (US)

(73) Assignee: Datto, Inc, Norwalk, CT (US)

( * ) Notice: Subject to any disclaimer, the term of this patent is extended or adjusted under 35 U.S.C. 154(b) by 0 days.

(21) Appl. No.: 16/442,514

(22) Filed: Jun. 16, 2019

(65) Prior Publication Data

US 2020/0394109 A1 Dec. 17, 2020

(51) Int. Cl.
*G06F 11/14* (2006.01)
*G06F 16/23* (2019.01)
*G06F 11/30* (2006.01)
*G06F 9/54* (2006.01)

(52) U.S. Cl.
CPC .......... *G06F 11/1451* (2013.01); *G06F 9/545* (2013.01); *G06F 11/1469* (2013.01); *G06F 11/3034* (2013.01); *G06F 16/2358* (2019.01)

(58) Field of Classification Search
CPC ............. G06F 11/1451; G06F 11/1466; G06F 12/0862
See application file for complete search history.

(56) References Cited

U.S. PATENT DOCUMENTS

| 6,785,786 | B1 | 8/2004 | Gold | |
| 6,847,984 | B1* | 1/2005 | Midgley | .............. G06F 11/1466 |
| 9,235,582 | B1 | 1/2016 | Madiraju Varadaraju | |
| 9,690,666 | B1 | 6/2017 | Shembavnekar | |
| 9,811,422 | B2 | 11/2017 | Bushman | |
| 10,204,016 | B1* | 2/2019 | Patwardhan | ........ G06F 11/1451 |
| 2005/0086443 | A1* | 4/2005 | Mizuno | ............... G06F 11/1458 711/162 |
| 2010/0100696 | A1 | 4/2010 | Suzuki | |
| 2011/0282841 | A1 | 11/2011 | Saika | |
| 2013/0226870 | A1 | 8/2013 | Dash | |

(Continued)

OTHER PUBLICATIONS

U.S. Appl. No. 16/055,347.

(Continued)

*Primary Examiner* — Getente A Yimer
(74) *Attorney, Agent, or Firm* — Hanchuk Kheit LLP; Walter G Hanchuk

(57) ABSTRACT

The User Space Incremental Tracking Apparatuses, Methods and Systems ("USIT") transforms backup driver installation request, backup data store request inputs via USIT components into backup driver installation response, backup data store response outputs. A new most recent activity entry in a file system journal associated with a data volume is determined by a user space tracking agent. Newly changed files on the data volume are determined by processing journal entries between a previous most recent activity entry, as indicated by a last entry marker, and the new most recent activity entry. Changed data blocks associated with the newly changed files are determined. The changed data blocks are marked as changed in a tracking store. The last entry marker is updated to reflect the new most recent activity entry. Data blocks flagged as changed are sent to a backup device. The sent data blocks are marked as unchanged.

22 Claims, 7 Drawing Sheets

(56) References Cited

U.S. PATENT DOCUMENTS

| | | | |
|---|---|---|---|
| 2016/0011790 A1* | 1/2016 | Rostoker | G06F 12/0862 |
| | | | 711/103 |
| 2017/0091047 A1 | 3/2017 | Bangalore | |
| 2017/0293628 A1 | 10/2017 | Adler | |
| 2018/0173596 A1* | 6/2018 | Petracca | G06F 11/1471 |
| 2018/0239555 A1 | 8/2018 | Cao | |

OTHER PUBLICATIONS

U.S. Appl. No. 16/285,189.
U.S. Appl. No. 16/391,205.
U.S. Appl. No. 16/391,243.
U.S. Appl. No. 16/424,469.
U.S. Appl. No. 16/442,514.
U.S. Appl. No. 16/559,598.
U.S. Appl. No. 16/661,881.
U.S. Appl. No. 16/661,934.
U.S. Appl. No. 16/661,936.
U.S. Appl. No. 16/837,992.
U.S. Appl. No. 16/837,997; and.
U.S. Appl. No. 16/541,952.

* cited by examiner

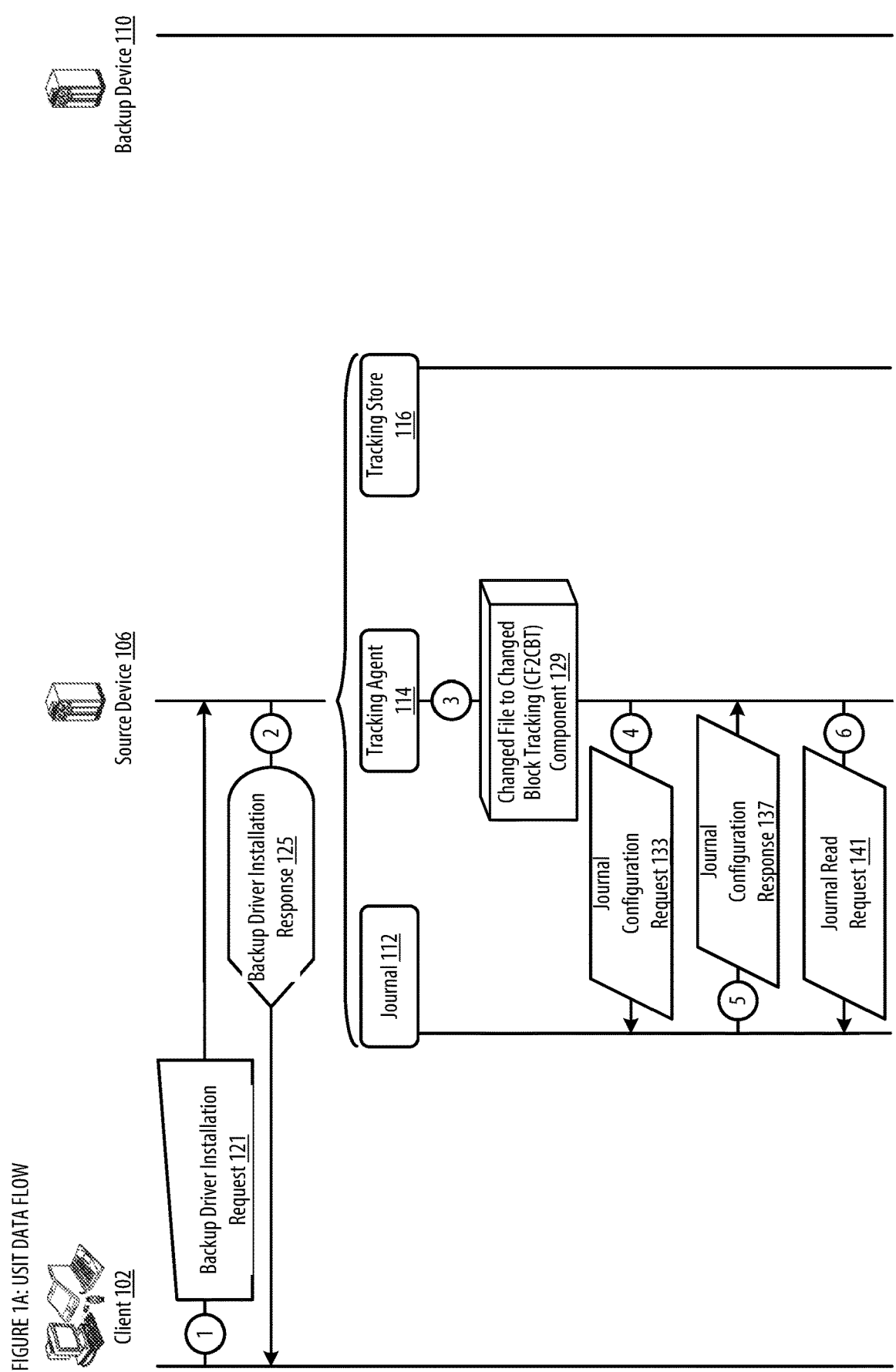

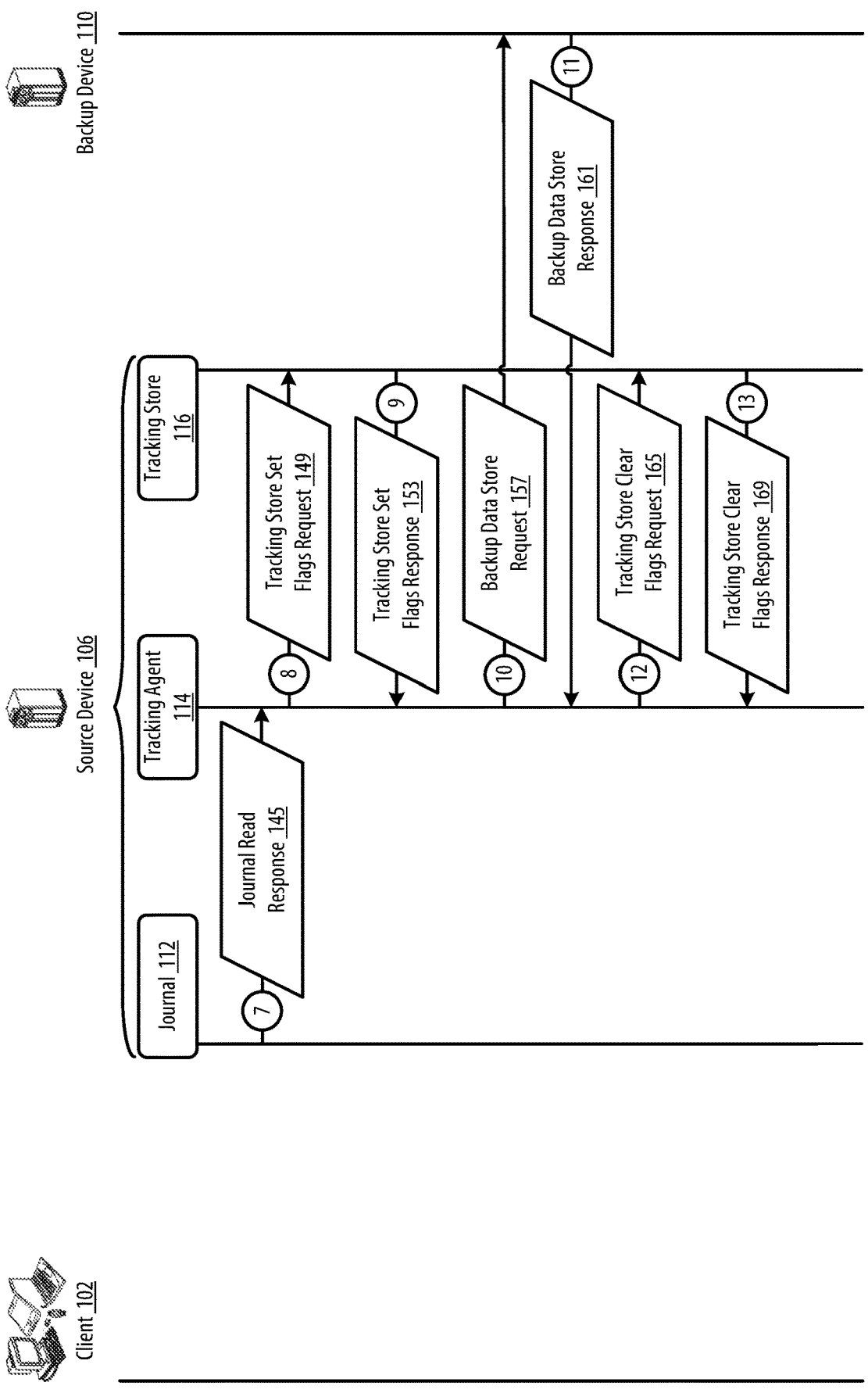
FIGURE 1B: USIT DATA FLOW

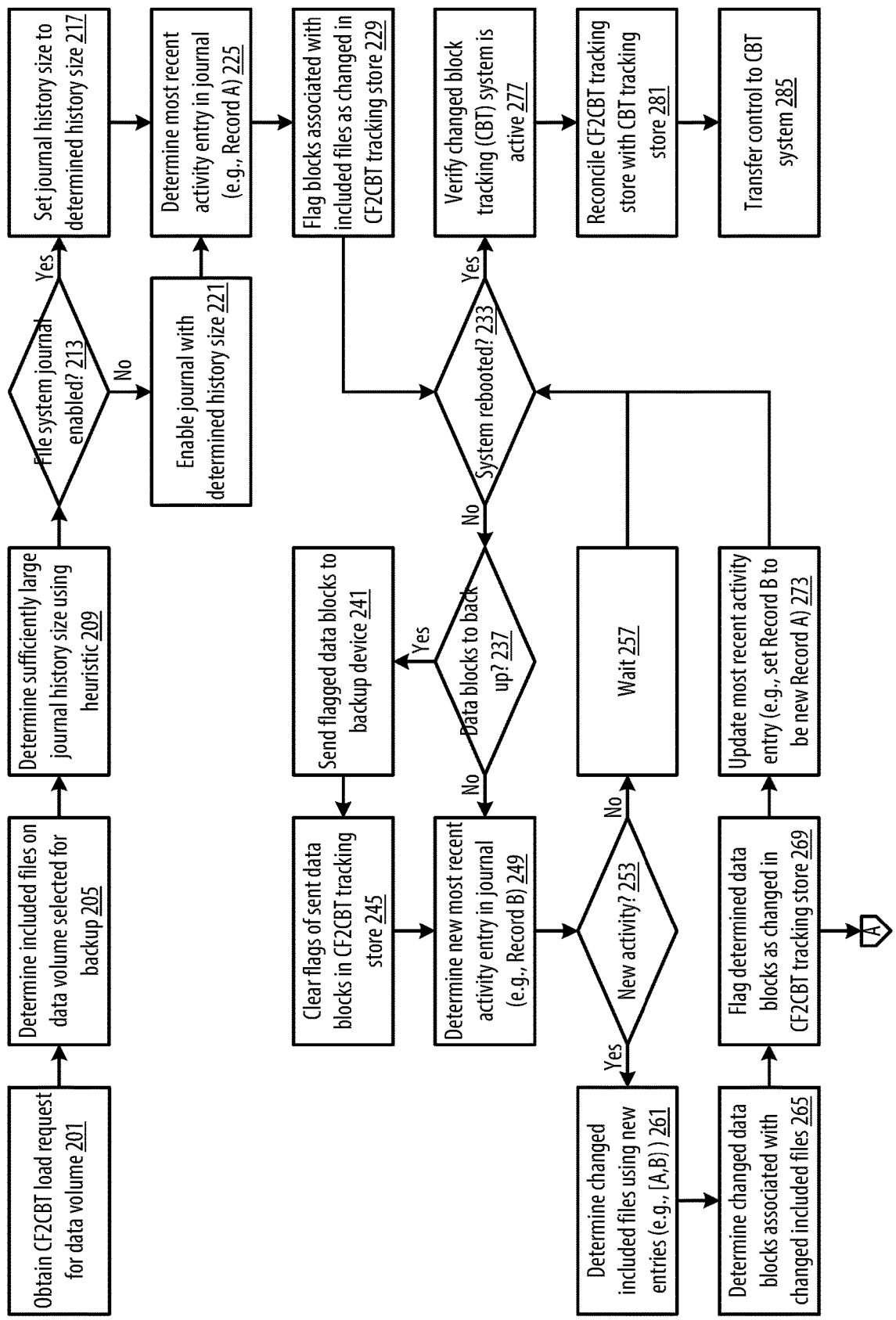

FIGURE 3: USIT CBF COMPONENT
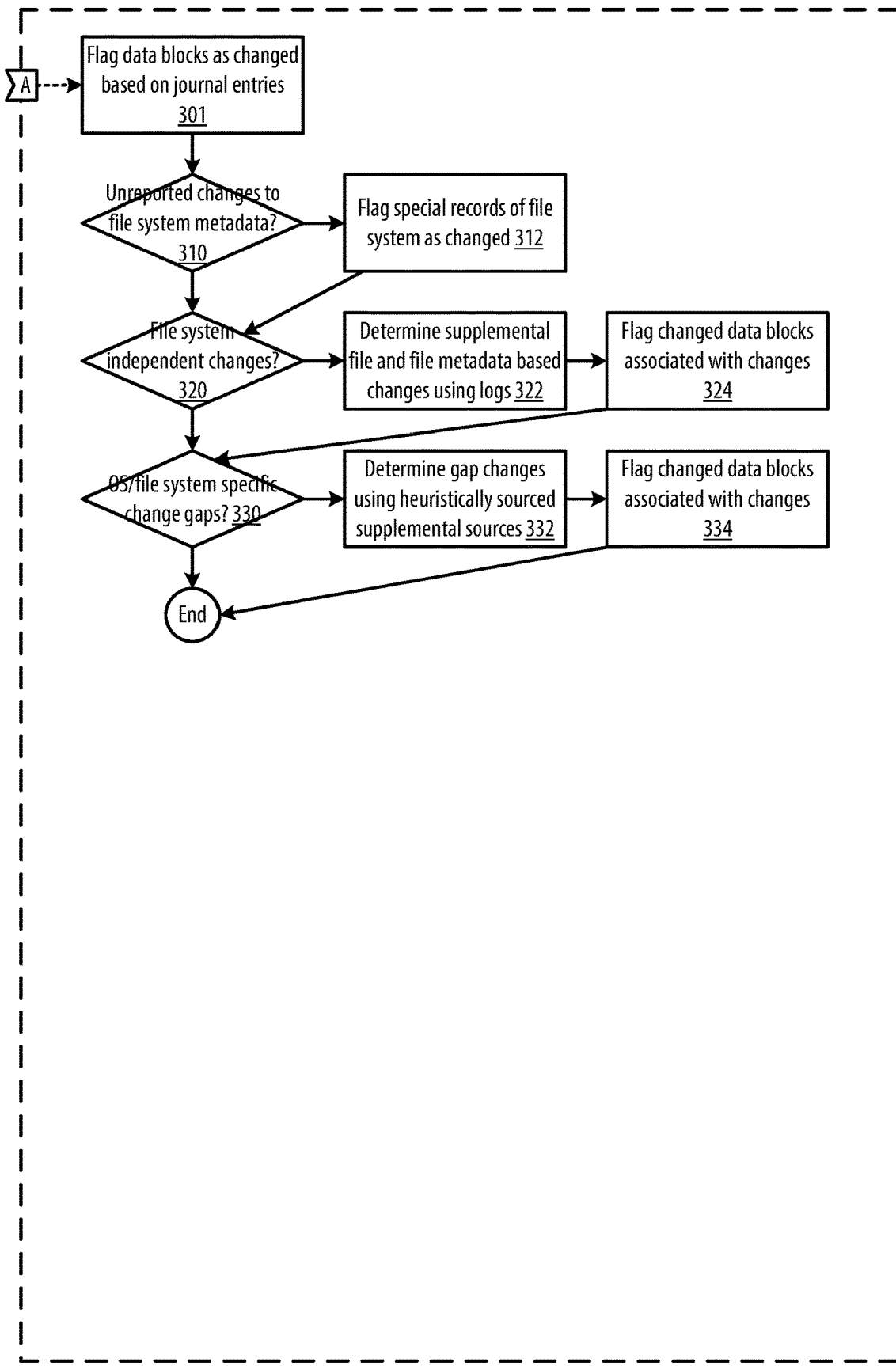

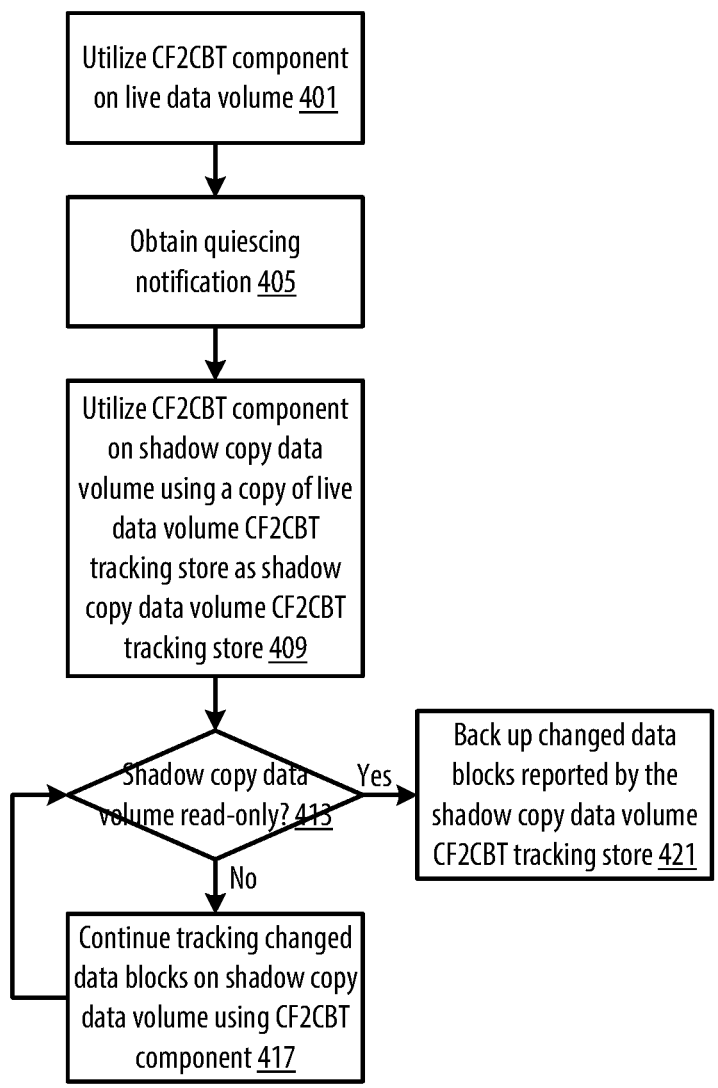

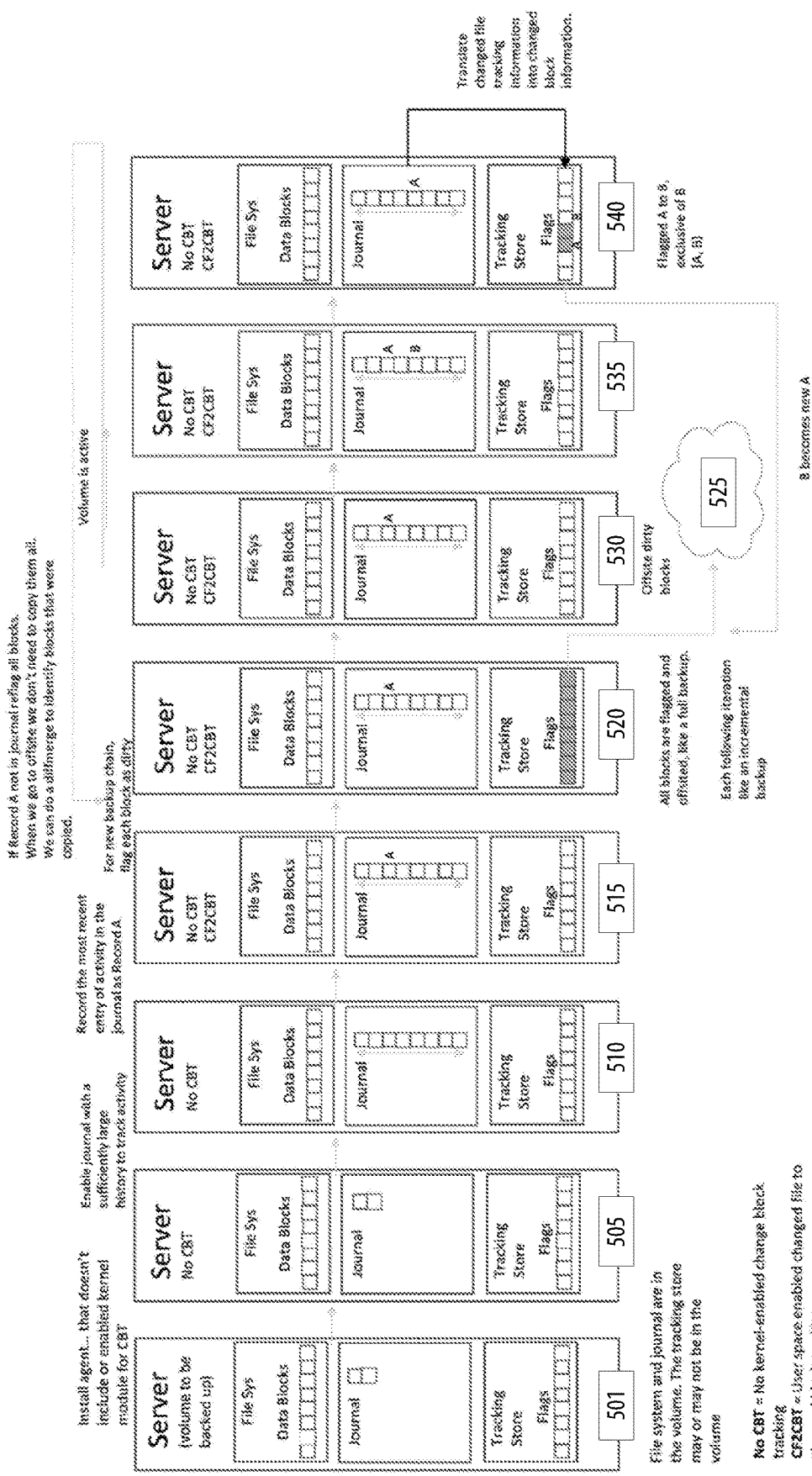
FIGURE 5: USIT IMPLEMENTATION CASE

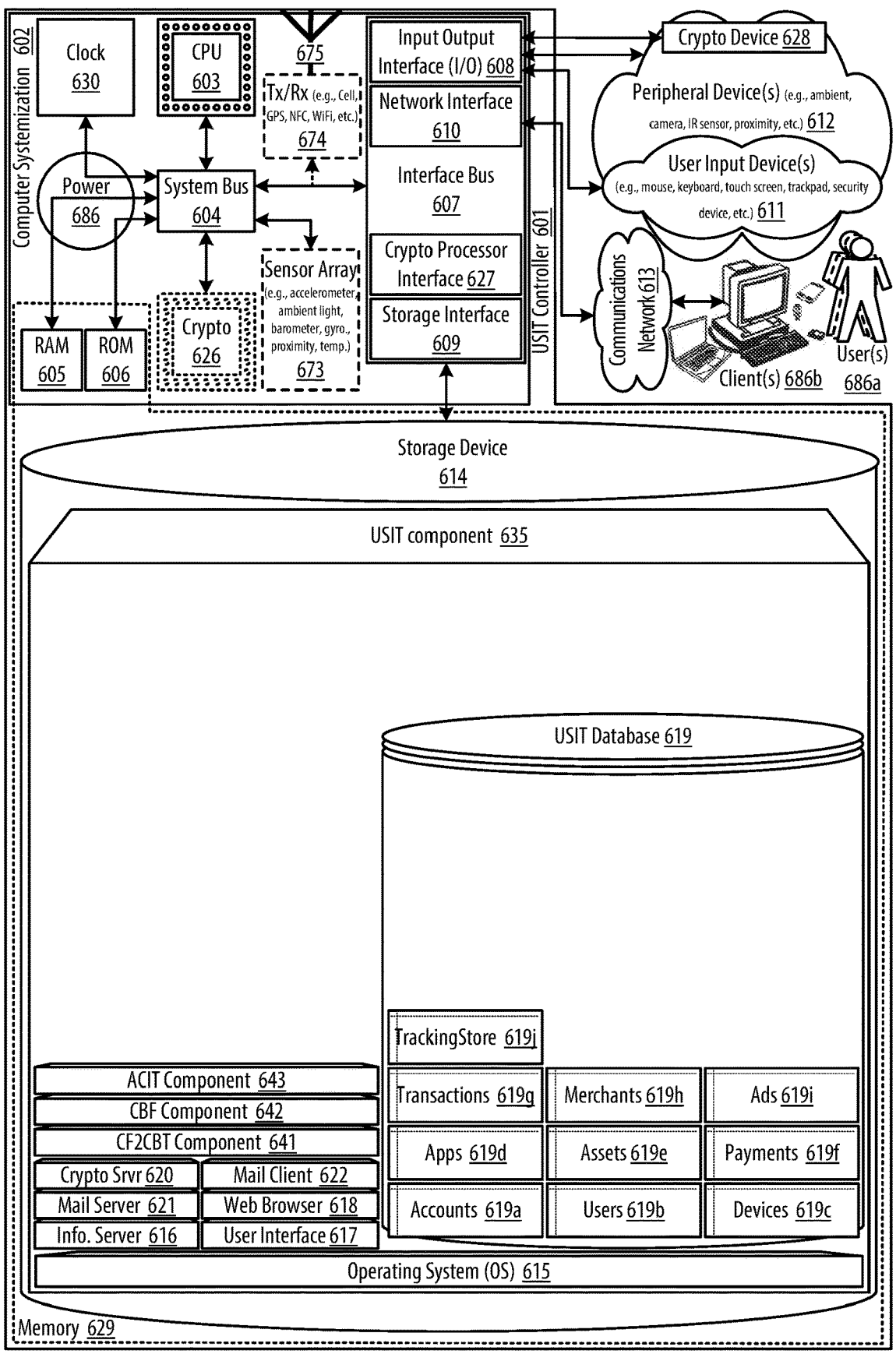
FIGURE 6: USIT Controller

USER SPACE INCREMENTAL TRACKING APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

OTHER APPLICATIONS

Applications of interest include: U.S. patent application Ser. No. 16/285,189, filed Feb. 25, 2019, entitled "Object-Level Metadata-Preserving Cross Heterogeneous Operating Systems Backup And Restore Apparatuses, Methods And Systems"; U.S. patent application Ser. No. 16/391,243, filed Apr. 22, 2019, entitled "Source Volume Backup with Predictive and Lookahead Optimizations Apparatuses, Methods and Systems".

The entire contents of the aforementioned applications are herein expressly incorporated by reference.

FIELD

The present innovations generally address backup systems, and more particularly, include User Space Incremental Tracking Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer system backups are utilized to protect data from being lost due to equipment failures, malware and accidental deletions. A backup may involve copying files to be backed up from one location to another location. For example, files may be copied from a solid-state drive in a user's desktop to an external hard drive that may be connected to the user's desktop via USB.

BRIEF DESCRIPTION OF THE DRAWINGS

Appendices and/or drawings illustrating various, non-limiting, example, innovative aspects of the User Space Incremental Tracking Apparatuses, Methods and Systems (hereinafter "USIT") disclosure, include:

FIGS. 1A-B show a datagraph illustrating data flow(s) for the USIT;

FIG. 2 shows a logic flow illustrating embodiments of a changed file to changed block tracking (CF2CBT) component for the USIT;

FIG. 3 shows a logic flow illustrating embodiments of a changed blocks flagging (CBF) component for the USIT;

FIG. 4 shows a logic flow illustrating embodiments of an application-consistent incremental tracking (ACM component for the USIT;

FIG. 5 shows implementation case(s) for the USIT;

FIG. 6 shows a block diagram illustrating embodiments of a USIT controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The User Space Incremental Tracking Apparatuses, Methods and Systems (hereinafter "USIT") transforms backup driver installation request, backup data store request inputs, via USIT components (e.g., CF2CBT, CBF, ACIT, etc. components), into backup driver installation response, backup data store response outputs. The USIT components, in various embodiments, implement advantageous features as set forth below.

Introduction

The USIT provides unconventional features (e.g., using user space components to handle incremental tracking for incremental backups) that were never before available in backup systems. For example, a backup may involve copying a disk image or changes to a disk image of a client computing device to a storage device, such as a local data storage device, or to storage in the cloud. In another example, a backup may involve copying a disk image or changes to a disk image from cloud storage to cloud storage or from cloud storage to a local storage device.

In some embodiments, the USIT facilitates tracking of write and other input/output (I/O) operations on a data volume when the operating system has had software or files installed that require the system to reboot before change tracking information may be recorded by a backup agent. For example, such software may include backup software (e.g., Datto Windows Agent (DWA), direct to cloud backup agents, cloud-based data continuity agents), drivers (e.g., Volume Snapshot Service (VSS), operating system upgrades, etc. The USIT facilitates tracking these operations performed on the data volume without having to reboot the machine and without causing interruption to operations performed on the volume. For example, to facilitate tracking these operations until scheduled downtime on production servers that may be hosting mission critical applications and workloads, where unscheduled downtime may be undesirable.

When a backup application initiates the operations to perform a backup of a volume, the backup application sends a request to a snapshot service that is provided by the operating system. The snapshot represents the state of the volume at a particular point in time. In response to the request, the snapshot service causes the snapshot to be created and provides the snapshot to the backup application. Backup applications commonly perform incremental backups, periodically capturing any changes in the volume since the last backup was performed. To enable these incremental backups, the backup application continuously tracks write operations on the volume and maintains a changed data block bitmap. This changed data block bitmap may then be used to perform a subsequent backup.

Tracking of writes may be accomplished by registering a suitably capable driver associated with the volume. The driver may be responsible for performing write operations to the volume. Once registered, the driver may monitor write operations and maintain a bitmap of data blocks that have changed since a particular point in time.

This approach of registering the driver typically requires the system to be rebooted for the driver to successfully attach to the volume device stacks that were already built prior to registering the filter. If the system is not rebooted after registering the driver on a running machine, the OS attaches the driver only against volumes that come up after it was registered. Hence, without rebooting, the driver will not perform changed block tracking and information utilized for incremental backups may be lost. Backups will be missed until the reboot occurs and a full backup may have to be performed. Because a user may wait days or weeks before rebooting the user's machine, using user space components that do not require a reboot to handle incremental tracking for incremental backups may greatly decrease the period of time associated with the first consistent backup of a machine.

USIT

FIGS. 1A-B show a datagraph illustrating data flow(s) for the USIT. In FIG. 1, a client 102 (e.g., of a user) may send a backup driver installation request 121 to a source device 106 to facilitate installation of backup software on the source device (e.g., without rebooting the source device to enable a driver to perform changed block tracking). For example, the client may be a desktop, a laptop, a tablet, a smartphone, a smartwatch, and/or the like that is executing a client application. It is to be understood that, in some implementations, the client and the source device may be the same device. In one implementation, the backup driver installation request may include data such as a request identifier, a user identifier, a data volume identifier, a paired backup device identifier, a backup schedule, a set of files included for backup, and/or the like. In one embodiment, the client may provide the following example backup driver installation request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
        <timestamp>2020-12-31 23:59:59</timestamp>
        <user_accounts_details>
            <user_account_credentials>
                <user_name>JohnDaDoeDoeDoooe@gmail.com</user_name>
                <password>abc123</password>
                //OPTIONAL <cookie>cookieID</cookie>
                //OPTIONAL <digital_cert_link>www.mydigitalcertificate.com/
JohnDoeDaDoeDoe@gmail.com/mycertifcate.dc</digital_cert_link>
                //OPTIONAL <digital_certificate>_DATA_</digital_certificate>
            </user_account_credentials>
        </user_accounts_details>
        <client_details> //iOS Client with App and Webkit
                //it should be noted that although several client details
                //sections are provided to show example variants of client
                //sources, further messages will include only on to save
                //space
            <client_IP>10.0.0.123</client_IP>
            <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>app with webkit</client_app_type>
            <app_installed_flag>true</app_installed_flag>
            <app_name>USIT.app</app_name>
            <app_version>1.0 </app_version>
            <app_webkit_name>Mobile Safari</client_webkit_name>
            <client_version>537.51.2</client_version>
        </client_details>
        <client_details> //iOS Client with Webbrowser
            <client_IP>10.0.0.123</client_IP>
            <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
```

```
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <backup_driver_installation_request>
        <request_identifier>ID_request_1</request_identifier>
        <user_identifier>ID_user_1</user_identifier>
        <volume_identifier>ID_volume_1</volume_identifier>
        <backup_device_identifier>ID_backup_device_1</backup_device_identifier>
        <backup_schedule>create a snapshot 3 times per day</backup_schedule>
        <included_files>files on C drive</included_files>
    </backup_driver_installation_request>
</auth_request>
```

The source device may send a backup driver installation response 125 to the client to inform the user that the backup driver was installed successfully. In one implementation, the backup driver installation response may include data such as a response identifier, a status, and/or the like. In one embodiment, the source device may provide the following example backup driver installation response, substantially in the form of a HTTP(S) POST message including XML-formatted data, as provided below:

```
POST /backup_driver_installation_response.php HTTP/1.1
Host: www.server.com
Content-Type: Application/XML
Content-Length: 667
<?XML version = "1.0" encoding = "UTF-8"?>
<backup_driver_installation_response>
    <response_identifier>ID_response_1</response_identifier>
    <status>OK</status>
</backup_driver_installation_response>
```

A changed file to changed block tracking (CF2CBT) component 129 may utilize data provided in the backup driver installation request to facilitate using user space components to handle incremental tracking for incremental backups. See FIG. 2 for additional details regarding the CF2CBT component.

A tracking agent 114 on the source device may send a journal configuration request 133 to a file system journal 112 of a volume included for backup to configure the file system's journal mechanism with a sufficiently large journal history size to track activity on the included volume. In one implementation, the journal configuration request may include data such as a request identifier, a volume identifier, a journal size, and/or the like. In one embodiment, the tracking agent may provide the following example journal configuration request, substantially in the form of a HTTP(S) POST message including XML-formatted data, as provided below:

```
POST /journal_configuration_request.php HTTP/1.1
Host: www.server.com
Content-Type: Application/XML
Content-Length: 667
<?XML version = "1.0" encoding = "UTF-8"?>
<journal_configuration_request>
    <request_identifier>ID_request_2</request_identifier>
    <volume_identifier>ID_volume_1 (e.g., C drive)</volume_identifier>
```

```
    <journal_size>64MB</journal_size>
</journal_configuration_request>
```

The journal may send a journal configuration response 137 to the tracking agent to confirm that the journal size was updated successfully. In one implementation, the journal configuration response may include data such as a response identifier, a status, and/or the like. In one embodiment, the journal may provide the following example journal configuration response, substantially in the form of a HTTP(S) POST message including XML-formatted data, as provided below:

```
POST /journal_configuration_response.php HTTP/1.1
Host: www.server.com
Content-Type: Application/XML
Content-Length: 667
<?XML version = "1.0" encoding = "UTF-8"?>
<journal_configuration_response>
    <response_identifier>ID_response_2</response_identifier>
    <status>OK</status>
</journal_configuration_response>
```

The tracking agent may send a journal read request 141 to the journal to determine new changes to (e.g., included) files and/or directories on the volume. In one implementation, the journal read request may include data such as a request identifier, a volume identifier, a last processed change record identifier, and/or the like. In one embodiment, the tracking agent may provide the following example journal read request, substantially in the form of a HTTP(S) POST message including XML-formatted data, as provided below:

```
POST /journal_read_request.php HTTP/1.1
Host: www.server.com
Content-Type: Application/XML
Content-Length: 667
<?XML version = "1.0" encoding = "UTF-8"?>
<journal_read_request>
        <request_identifier>ID_request_3</request_identifier>
        <volume_identifier>ID_volume_1 (e.g., C drive)</
        volume_identifier>
        <last_processed_record_identifier>ID_Record_A-1</
        last_processed_record_identifier>
</journal_read_request>
```

The journal may send a journal read response 145 to the tracking agent with the requested change records. In one implementation, the journal read response may include data such as a response identifier, the requested change records, and/or the like. In one embodiment, the journal may provide the following example journal read response, substantially in the form of a HTTP(S) POST message including XML-formatted data, as provided below:

```
POST /journal_read_response.php HTTP/1.1
Host: www.server.com
Content-Type: Application/XML
Content-Length: 667
<?XML version = "1.0" encoding = "UTF-8"?>
<journal_read_response>
    <response_identifier>ID_response_3</response_identifier>
    <change_records>
        <change_record>
            <record_identifier>ID_Record_A</record_identifier>
```

-continued

```
            <record_description>file modified</record_description>
            <record_affected_file>C:\file1.txt</record_affected_file>
        </change_record>
        <change_record>
            <record_identifier>ID_Record_A+1</record_identifier>
            <record_description>directory added</record_description>
            <record_affected_directory>C:\notes</record_affected_directory>
        </change_record>
        ...
        <change_record>
            <record_identifier>ID_Record_B-1</record_identifier>
            <record_description>file added</record_description>
            <record_affected_file>C:\notes\file2.txt</record_affected_file>
        </change_record>
    <change_records>
</journal_read_response>
```

The tracking agent may send a tracking store set flags request 149 to a tracking store 116 associated with the volume to set changed flags for data blocks associated with files and/or directories with the new changes. In one implementation, the tracking store set flags request may include data such as a request identifier, a volume identifier, a request type, data blocks, and/or the like. In one embodiment, the tracking agent may provide the following example tracking store set flags request, substantially in the form of a HTTP(S) POST message including XML-formatted data, as provided below:

```
POST /tracking_store_set_flags_request.php HTTP/1.1
Host: www.server.com
Content-Type: Application/XML
Content-Length: 667
<?XML version = "1.0" encoding = "UTF-8"?>
<tracking_store_set_flags_request>
    <request_identifier>ID_request_4</request_identifier>
    <volume_identifier>ID_volume_1 (e.g., C drive)
    </volume_identifier>
    <request_type>SET_CHANGED_FLAGS</request_type>
    <data_blocks>data blocks associated with the new changes
    </data_blocks>
</tracking_store_set_flags_request>
```

The tracking store may send a tracking store set flags response 153 to the tracking agent to confirm that the changed flags were set successfully. In one implementation, the tracking store set flags response may include data such as a response identifier, a status, and/or the like. In one embodiment, the tracking store may provide the following example tracking store set flags response, substantially in the form of a HTTP(S) POST message including XML-formatted data, as provided below:

```
POST /tracking_store_set_flags_response.php HTTP/1.1
Host: www.server.com
Content-Type: Application/XML
Content-Length: 667
```

```
<?XML version = "1.0" encoding = "UTF-8"?>
<tracking_store_set_flags_response>
    <response_identifier>ID_response_4</response_identifier>
    <status>OK</status>
</tracking_store_set_flags_response>
```

The tracking agent may send a backup data store request 157 to a backup device 110 to facilitate storing backup data. In one implementation, the backup data store request may include data such as a request identifier, a source device identifier, a user identifier, data blocks, and/or the like. In one embodiment, the tracking agent may provide the following example backup data store request, substantially in the form of a HTTP(S) POST message including XML-formatted data, as provided below:

```
POST /backup_data_store_request.php HTTP/1.1
Host: www.server.com
Content-Type: Application/XML
Content-Length: 667
<?XML version = "1.0" encoding = "UTF-8"?>
<backup_data_store_request>
    <request_identifier>ID_request_5</request_identifier>
    <source_device_identifier>ID_source_device_1</source_device_identifier>
    <user_identifier>ID_user_1</user_identifier>
    <data_blocks>data blocks with changed flags set</data_blocks>
</backup_data_store_request>
```

The backup device may send a backup data store response 161 to the tracking agent to confirm that the backup data was stored successfully. In one implementation, the backup data store response may include data such as a response identifier, a status, and/or the like. In one embodiment, the backup device may provide the following example backup data store response, substantially in the form of a HTTP(S) POST message including XML-formatted data, as provided below:

```
POST /backup_data_store_response.php HTTP/1.1
Host: www.server.com
Content-Type: Application/XML
Content-Length: 667
<?XML version = "1.0" encoding = "UTF-8"?>
<backup_data_store_response>
    <response_identifier>ID_response_5</response_identifier>
    <status>OK</status>
</backup_data_store_response>
```

The tracking agent may send a tracking store clear flags request 165 to the tracking store to clear changed flags for data blocks that were backed up to the backup device. In one implementation, the tracking store clear flags request may include data such as a request identifier, a volume identifier, a request type, data blocks, and/or the like. In one embodiment, the tracking agent may provide the following example tracking store clear flags request, substantially in the form of a HTTP(S) POST message including XML-formatted data, as provided below:

```
POST /tracking_store_clear_flags_request.php HTTP/1.1
Host: www.server.com
Content-Type: Application/XML
Content-Length: 667
<?XML version = "1.0" encoding = "UTF-8"?>
<tracking_store_clear_flags_request>
    <request_identifier>ID_request_6</request_identifier>
    <volume_identifier>ID_volume_1 (e.g., C drive)</volume_identifier>
    <request_type>CLEAR_CHANGED_FLAGS</request_type>
    <data_blocks>data blocks that were backed up to the backup device</data_blocks>
</tracking_store_clear_flags_request>
```

The tracking store may send a tracking store clear flags response 169 to the tracking agent to confirm that the changed flags were cleared successfully. In one implementation, the tracking store clear flags response may include data such as a response identifier, a status, and/or the like. In one embodiment, the tracking store may provide the following example tracking store clear flags response, substantially in the form of a HTTP(S) POST message including XML-formatted data, as provided below:

```
POST /tracking_store_clear_flags_response.php HTTP/1.1
Host: www.server.com
Content-Type: Application/XML
Content-Length: 667
<?XML version = "1.0" encoding = "UTF-8"?>
<tracking_store_clear_flags_response>
    <response_identifier>ID_response_6</response_identifier>
    <status>OK</status>
</tracking_store_clear_flags_response>
```

FIG. 2 shows a logic flow illustrating embodiments of a changed file to changed block tracking (CF2CBT) component for the USIT. In FIG. 2, a CF2CBT load request for a data volume may be obtained at 201. For example, the CF2CBT load request for the data volume may be obtained as a result of installation (e.g., by a user) of software (e.g., backup software, drivers, operating system upgrades, etc.) that requires the operating system to reboot before change tracking information may be recorded by a backup agent to facilitate tracking I/O operations on the data volume by a tracking agent without having to reboot the system.

Included files on the data volume selected for backup may be determined at 205. For example, the files included for backup may be selected by the user. In one embodiment, the tracking agent may utilize change tracking information for data blocks associated with the included files, instead of for the whole data volume, to reduce resource (e.g., processor, I/O) utilization and improve performance. In one implementation, the CF2CBT load request may be parsed (e.g., using PHP commands) to determine the included files (e.g., based on the value of the included_files field).

A sufficiently large journal history size to track activity on the data volume may be determined using a heuristic at 209. For example, activity may include I/O operations that cause changes to data in the data volume (e.g., file operations such as file create, write, read, open, rename, etc.). In one implementation, the size of the journal history may be determined based on the number of files on the data volume, the size of the data volume, the expected utilization of the data volume, and/or the like. For example, a sufficiently large journal history size may be determined to be 64 MB.

A determination may be made at 213 whether a file system journal for the data volume (e.g., NTFS update sequence number (USN) change journal) is already enabled. For example, the file system journal may include one or more sources of change tracking information (e.g., user file changes, file-system transactional changes, heuristics to supplement missing tracking information in any of the file-system journal sub-components). If so, journal history size of the file system journal for the data volume may be set to the determined journal history size at 217. In one implementation, the FSCTL_CREATE_USN_JOURNAL control code may be utilized to update the journal history size (e.g., using the MaximumSize value of the CREATE_USN_JOURNAL_DATA structure). If not, a file system journal for the data volume may be created with the determined journal history size at 221. In one implementation, the FSCTL_CREATE_USN_JOURNAL control code may be utilized to create the file system journal.

The most recent activity entry in the journal (e.g., Record A) may be determined at 225. In one implementation, the FSCTL_QUERY_USN_JOURNAL control code may be utilized to query the journal to determine the identifier (e.g., number) of the next record to be written to the journal (e.g., using the NextUsn value of the USN_JOURNAL_DATA structure).

Data blocks associated with the included files on the data volume may be flagged as changed in a CF2CBT tracking store at 229. For example, the CF2CBT tracking store may maintain a bitmap of changed data blocks. In one implementation, the entire data volume may be included for backup, and data blocks of the data volume may be flagged as changed. In another implementation, data blocks associated with the included files may be determined, and such data blocks may be flagged as changed. For example, data blocks associated with the included files on the data volume may be flagged as changed in the CF2CBT tracking store via a MySQL database command similar to the following:

```
INSERT INTO TrackingStore
    (dataVolumeID, dataBlockID, dataBlockChangedFlag)
VALUES
    (ID_volume_1, ID of data block 1 associated with the included files,
    1),
    (ID_volume_1, ID of data block 2 associated with the included files,
    1),
    ...
    (ID_volume_1, ID of data block N associated with the included files,
    1);
```

A determination may be made at 233 whether the operating system was rebooted. If the operating system was not rebooted, a determination may be made at 237 whether there are data blocks to back up. In one embodiment, the CF2CBT component may be utilized to decrease the period of time associated with the first consistent backup of the data volume. Accordingly, data blocks flagged as changed in the CF2CBT tracking store may be backed up. In another embodiment, the CF2CBT component may be utilized to provide a redundancy supplement to a kernel-based changed block tracking (CBT) system (e.g., to provide change tracking functionality during Windows upgrades when the kernel-based CBT system is unloaded and/or non-functional) to improve processing efficiency (e.g., to avoid having to perform a more expensive differential merge once the CBT system is functional again). Accordingly, data blocks flagged as changed in the CF2CBT tracking store may be used to fill in gaps in the CBT system's tracking store and may not be backed up by the CF2CBT component.

If there are data blocks to back up, the flagged data blocks may be sent to a backup device at 241. In one implementation, the flagged data blocks may be stored via a backup data store request (e.g., a variety of optimizations may be used to improve the efficiency of storing the flagged data blocks). For example, the flagged data blocks to send may be determined via a MySQL database command similar to the following:

```
SELECT dataBlockID
FROM TrackingStore
WHERE dataVolumeID = ID_volume_1 AND dataBlockChangedFlag = 1;
```

Changed flags of sent data blocks may be cleared in the CF2CBT tracking store at 245. In one implementation, the changed flags of sent data blocks may be cleared via a tracking store clear flags request. For example, the changed flags of sent data blocks may be cleared via a MySQL database command similar to the following:

```
UPDATE TrackingStore
SET dataBlockChangedFlag = 0
WHERE dataVolumeID = ID_volume_1 AND
    dataBlockID IN (IDs of sent data blocks);
```

A new most recent activity entry in the journal (e.g., Record B) may be determined at 249. In one implementation, the FSCTL_QUERY_USN_JOURNAL control code may be utilized to query the journal to determine the identifier (e.g., number) of the next record to be written to the journal (e.g., using the NextUsn value of the USN_JOURNAL_DATA structure).

A determination may be made at 253 whether there is new activity in the journal. For example, if Record A is not the same as Record B, there is new activity in the journal. If there is no new activity, the CF2CBT component may wait at 257. In one implementation, the CF2CBT component may wait a specified amount of time (e.g., 5 minutes). In another implementation, the CF2CBT component may wait until it is notified by the journal that there is new activity.

If there is new activity, newly changed included files may be determined using new entries in the journal (e.g., Record A to Record B exclusive of Record B: [Record A, Record B)) at 261. In one implementation, the FSCTL_ENUM_USN_DATA control code and/or the FSCTL_READ_USN_JOURNAL control code may be utilized to read the journal and determine the newly changed included files.

Changed data blocks associated with the newly changed included files may be determined at 265. In one implementation, the journal may provide sufficient information to determine which data blocks of a newly changed file were modified. Accordingly, such modified data blocks may be determined. In another implementation, the journal may not provide sufficient information to determine which data blocks of a newly changed file were modified. Accordingly, each data block associated with the newly changed file may be marked as changed.

The determined changed data blocks may be flagged as changed in the CF2CBT tracking store at 269. For example, the changed data blocks may be flagged as changed in the CF2CBT tracking store via a MySQL database command similar to the following:

```
UPDATE TrackingStore
SET dataBlockChangedFlag = 1
WHERE dataVolumeID = ID_volume_1 AND
    dataBlockID IN (IDs of the changed data blocks);
```

In some implementations, additional data blocks may be flagged as changed to facilitate crash-consistent incremental tracking. See FIG. 3 for additional details regarding how crash-consistent incremental tracking may be facilitated.

A marker indicating the most recent activity entry in the journal may be updated to reflect new activity (e.g., Record B may be set to be new Record A) at 273. For example, a variable that stores the number of the most recent activity entry in the journal may be updated to indicate that preceding records have been processed and data in the tracking store updated accordingly.

In one embodiment, once the operating system is rebooted, the backup agent may use a kernel-based changed block tracking (CBT) system to record change tracking information for the data volume. A check may be performed to verify that the CBT system is active at 277. In one implementation, the CBT system may be queried to verify that the CBT system is functional (e.g., for the data volume).

The CF2CBT tracking store may be reconciled with a CBT tracking store at 281. For example, such reconciliation may allow the CF2CBT component to provide a redundancy supplement to the CBT system. In one implementation, once the operating system reboots, changes to the data volume recorded in the CF2CBT tracking store (e.g., while the CBT system was non-functional) may be transferred over to the CBT tracking store to ensure that there are no tracking gaps in the CBT tracking store. Once the CF2CBT tracking store is reconciled with the CBT tracking store, control may be transferred to the CBT system at 285. For example, the CBT system may perform an incremental backup when scheduled.

FIG. 3 shows a logic flow illustrating embodiments of a changed blocks flagging (CBF) component for the USIT. In one embodiment, the CBF component may facilitate crash-consistent incremental tracking by filling in any gaps in the tracking information provided by the file-system specific journal (e.g., as compared to the kernel-based CBT system) using additional data sources (e.g., metafiles) and/or heuristics.

Data blocks may be flagged as changed based on journal entries at 301. For example, the changed data blocks may be flagged as changed in the CF2CBT tracking store as discussed with regard to 269.

A determination may be made at 310 whether there exist changes to file system metadata unreported by the journal. For example, such changes may include changes to the NTFS master file table (MFT). If so, special records of the file system may be flagged as changed at 312. In one implementation, data blocks associated with the special records may be flagged as changed in the CF2CBT tracking store.

A determination may be made at 320 whether there exist file system independent changes. For example, such changes may include disk defragmentation, file system integrity tool runs, and/or the like. If so, supplemental file and/or file metadata based changes may be determined using supplemental file system transaction logs (e.g., NTFS $Logfile) at 322. Data blocks associated with the supplemental file and/or file metadata based changes may be flagged as changed in the CF2CBT tracking store at 324.

A determination may be made at 330 whether there exist operating system and/or file system specific change gaps. If so, such gap changes may be determined using heuristically sourced supplemental sources at 332. Data blocks associated with the gap changes may be flagged as changed in the CF2CBT tracking store at 334.

FIG. 4 shows a logic flow illustrating embodiments of an application-consistent incremental tracking (ACIT) component for the USIT. In one embodiment, the ACIT component may facilitate application-consistent incremental tracking by integrating into a quiescing sub-system of the operating system (e.g., Windows Volume Snapshot Service (VSS)).

At 401, the CF2CBT component may be utilized to track changed data blocks on a live data volume. A quiescing notification may be obtained (e.g., from the quiescing sub-system) at 405. In one embodiment, quiescing may be initiated to facilitate an application-consistent backup of the live data volume. Once quiescing is initiated, the quiescing sub-system may create a writeable shadow copy data volume of the live data volume, and write and/or flush application-specific (e.g., in-memory) data provided by writer processes (e.g., a set of user-space scripts for specific applications that bring those applications into consistent states for backup) to the shadow copy data volume.

The CF2CBT component may be utilized on the shadow copy data volume using a copy of live data volume CF2CBT tracking store as shadow copy data volume CF2CBT tracking store at 409. In one implementation, the live data volume CF2CBT tracking store may be copied to the shadow copy data volume CF2CBT tracking store, and the CF2CBT component may be utilized to track changed data blocks on the shadow copy data volume. For example, changes made by the writer processes may be tracked. In one embodiment, data blocks flagged as changed in the shadow copy data volume CF2CBT tracking store may be used to track changes, and may not be backed up by the CF2CBT component (e.g., in a similar way as discussed with regard to the redundancy supplement embodiment at 237).

A determination may be made at 413 whether the quiescing sub-system made the shadow copy data volume read-only. For example, the quiescing sub-system may give the writer processes 60 seconds to write data, after which the quiescing sub-system may make the shadow copy data volume read-only. If the shadow copy data volume is not read-only, changed data blocks on the shadow copy data volume may continue to be tracked using the CF2CBT component at 417.

If the shadow copy data volume is read-only, changed data blocks as reported by the shadow copy data volume CF2CBT tracking store may be backed up at 421. In one implementation, the changed data blocks may be sent to a backup device via a backup data store request (e.g., in a similar way as discussed at 241). Once the application-consistent backup is complete, the quiescing sub-system may remove the shadow copy data volume, and the shadow copy data volume CF2CBT tracking store may be removed.

FIG. 5 shows implementation case(s) for the USIT. In FIG. 5, an exemplary embodiment of utilizing the CF2CBT component is illustrated. As shown at 501, a user may install a backup agent for a data volume to be backed up that either does not include a CBT system or for which the CBT system is not loaded and/or functional. As shown at 505, a CF2CBT tracking store may be created. As shown at 510, journal history size of the file system journal for the data volume may be set to a sufficiently large journal history size to track activity on the data volume. As shown at 515, the most recent activity entry in the journal (e.g., Record A) may be determined. As shown at 520, for the first iteration through the loop, each data block (e.g., associated with files included for backup) of the data volume may be flagged as dirty in the CF2CBT tracking store. For subsequent iterations, newly changed data blocks (e.g., associated with files included for backup) of the data volume may be flagged as dirty in the CF2CBT tracking store. As shown at 525, data blocks marked as dirty may be backed up (e.g., to an offsite backup device, such as a cloud backup system). As shown at 530, backed up data blocks may be flagged as clean in the CF2CBT tracking store. As shown at 535, a new most recent activity entry in the journal (e.g., Record B) may be determined. As shown at 540, newly changed data blocks (e.g., associated with files included for backup) of the data volume may be flagged as dirty in the CF2CBT tracking store, and a marker indicating the most recent activity entry in the journal may be updated to reflect new activity (e.g., Record B may be set to be new Record A).

USIT Controller

FIG. 6 shows a block diagram illustrating embodiments of a USIT controller. In this embodiment, the USIT controller 601 may serve to aggregate, process, store, search, serve, identify, instruct, generate, match, and/or facilitate interactions with a computer through backup systems technologies, and/or other related data.

Users, which may be people and/or other systems, may engage information technology systems (e.g., computers) to facilitate information processing. In turn, computers employ processors to process information; such processors 603 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the USIT controller 601 may be connected to and/or communicate with entities such as, but not limited to: one or more users from peripheral devices 612 (e.g., user input devices 611); an optional cryptographic processor device 628; and/or a communications network 613.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The USIT controller 601 may be based on computer systems that may comprise, but are not limited to, components such as: a computer systemization 602 connected to memory 629.

Computer Systemization

A computer systemization 602 may comprise a clock 630, central processing unit ("CPU(s)" and/or "processor(s)" (these terms are used interchangeably throughout the disclosure unless noted to the contrary)) 603, a memory 629 (e.g., a read only memory (ROM) 606, a random access memory (RAM) 605, etc.), and/or an interface bus 607, and most frequently, although not necessarily, are all interconnected and/or communicating through a system bus 604 on one or more (mother)board(s) 602 having conductive and/or otherwise transportive circuit pathways through which instructions (e.g., binary encoded signals) may travel to effectuate communications, operations, storage, etc. The computer systemization may be connected to a power source 686; e.g., optionally the power source may be internal. Optionally, a cryptographic processor 626 may be connected to the system bus. In another embodiment, the cryptographic processor, transceivers (e.g., ICs) 674, and/or sensor array (e.g., accelerometer, altimeter, ambient light, barometer, global positioning system (GPS) (thereby allowing USIT controller to determine its location), gyroscope, magnetometer, pedometer, proximity, ultra-violet sensor, etc.) 673 may be connected as either internal and/or external peripheral devices 612 via the interface bus I/O 608 (not pictured) and/or directly via the interface bus 607. In turn, the transceivers may be connected to antenna(s) 675, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1 +EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the USIT controller and beyond through various interfaces. Should processing requirements dictate a greater amount speed and/or capacity, distributed processors (e.g., see Distributed USIT below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the USIT may be achieved by implementing a microcontroller such as CAST's® R8051XC2 microcontroller; Intel's® MCS 51 (i.e., 8051 microcontroller); and/or the like. Also, to implement certain features of the USIT, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the USIT component collection (distributed or otherwise) and/or features may be implemented via the microprocessor and/or via embedded components; e.g., via ASIC, coprocessor, DSP, FPGA, and/or the like. Alternately, some implementations of the USIT may be implemented with embedded components that are configured and used to achieve a variety of features or signal processing.

Depending on the particular implementation, the embedded components may include software solutions, hardware solutions, and/or some combination of both hardware/software solutions. For example, USIT features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the USIT features. A hierarchy of programmable interconnects allow logic blocks to be interconnected as needed by the USIT system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the USIT may be developed on FPGAs and then migrated into a fixed version that more resembles ASIC implementations. Alternate or coordinating implementations may migrate USIT controller features to a final ASIC instead of or in addition to FPGAs. Depending on the implementation all of the aforementioned embedded components and microprocessors may be considered the "CPU" and/or "processor" for the USIT.

Power Source

The power source 686 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the USIT thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, variously although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the USIT controller is accessible through remote clients 633b (e.g., computers with web browsers) by users 633a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed USIT below), architectures may similarly be employed to pool, load balance, and/or otherwise decrease/increase the communicative bandwidth required by the USIT controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user, peripheral devices 612 (e.g., input devices 611), cryptographic processor devices 628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 612 may be connected and/or communicate to I/O and/or other facilities of the like such as network interfaces, storage interfaces, directly to the interface bus, system bus, the CPU, and/or the like. Peripheral devices may be external, internal and/or part of the USIT controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 611 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the USIT controller may be embodied as an embedded, dedicated, and/or monitor-less (i.e., headless) device, wherein access would be provided over a network interface connection.

Cryptographic units such as, but not limited to, microcontrollers, processors 626, interfaces 627, and/or devices

628 may be attached, and/or communicate with the USIT controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+ MB/s of cryptographic instructions; VLSI Technology's® 33 MHz 6868; and/or the like.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the USIT controller and/or a computer systemization may employ various forms of memory 629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 629 will include ROM 606, RAM 605, and a storage device 614. A storage device 614 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 629 may contain a collection of program and/or database components and/or data such as, but not limited to: operating system component(s) 615 (operating system); information server component(s) 616 (information server); user interface component(s) 617 (user interface); Web browser component(s) 618 (Web browser); database(s) 619; mail server component(s) 621; mail client component(s) 622; cryptographic server component(s) 620 (cryptographic server); the USIT component(s) 635; and/or the like (i.e., collectively a component collection). These components may be stored and accessed from the storage devices and/or from storage devices accessible through an interface bus. Although unconventional program components such as those in the component collection may be stored in a local storage device 614, they may also be loaded and/or stored in memory such as: peripheral devices, RAM, remote storage facilities through a communications network, ROM, various forms of memory, and/or the like.

Operating System

The operating system component 615 is an executable program component facilitating the operation of the USIT controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the USIT controller to communicate with other entities through a communications network 613. Various communication protocols may be used by the USIT controller as a subcarrier transport mechanism for interaction, such as, but not limited to: multicast, TCP/IP, UDP, unicast, and/or the like.

Information Server

An information server component 616 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the USIT controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the USIT database 619, operating systems, other program components, user interfaces, Web browsers, and/or the like.

Access to the USIT database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the USIT. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the USIT as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 617 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 618 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the USIT enabled nodes. The combined application may be nugatory on systems employing Web browsers.

Mail Server

A mail server component 621 is a stored program component that is executed by a CPU 603. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the USIT. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the USIT mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 622 is a stored program component that is executed by a CPU 603. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 620 is a stored program component that is executed by a CPU 603, cryptographic processor 626, cryptographic processor interface 627, cryptographic processor device 628, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the USIT may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the USIT component to engage in secure transactions if so desired. The cryptographic component facilitates the secure accessing of resources on the USIT and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The USIT Database

The USIT database component 619 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field;

i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the USIT database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the USIT database is implemented as a data-structure, the use of the USIT database 619 may be integrated into another component such as the USIT component 635. Also, the database may be implemented as a mix of data structures, objects, and relational structures. Databases may be consolidated and/or distributed in countless variations (e.g., see Distributed USIT below). Portions of databases, e.g., tables, may be exported and/or imported and thus decentralized and/or integrated.

In one embodiment, the database component 619 includes several tables 619a-j:

An accounts table 619a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 619b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a USIT);

An devices table 619c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 619d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePotNo, appAccessPrivileges, appPreferences, appRestrictions, portNum, access_API_call, linked_wallets_list, and/or the like;

An assets table 619e includes fields such as, but not limited to: assetID, accountID, userID, distributorAccountID, distributorPaymentID, distributorOwnerID, as setOwnerID, as setType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, as setZIPcode, assetState, as setCountry, assetEmail, as setIPaddress, assetURLaccessCode, as setOwnerAccountID, subscriptionIDs, assetAuthroizationCode, assetAccessPrivileges, assetPreferences, assetRestrictions, assetAPI, assetAPIconnectionAddress, and/or the like;

A payments table 619f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 619g includes fields such as, but not limited to: transactionID, accountID, as setIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 619h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 619i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), as setID, merchantID, deviceID, userID, accountID, impressionID, impressionOS, impressionTimeStamp, impressionGeo, impressionAction, impressionType, impressionPublisherID, impressionPublisherURL, and/or the like;

A tracking store table 619j includes fields such as, but not limited to: dataVolumeID, dataBlockID, dataBlockChangedFlag, and/or the like.

In one embodiment, the USIT database may interact with other database systems. For example, employing a distributed database system, queries and data access by search USIT component may treat the combination of the USIT database, an integrated data security layer database as a single database entity (e.g., see Distributed USIT below).

In one embodiment, user programs may contain various user interface primitives, which may serve to update the USIT. Also, various accounts may require custom database tables depending upon the environments and the types of clients the USIT may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 619a-j. The USIT may be configured to keep track of various settings, inputs, and parameters via database controllers.

The USIT database may communicate to and/or with other components in a component collection, including itself, and/or facilities of the like. Most frequently, the USIT database communicates with the USIT component, other program components, and/or the like. The database may contain, retain, and provide information regarding other nodes and data.

The USITs

The USIT component 635 is a stored program component that is executed by a CPU. In one embodiment, the USIT component incorporates any and/or all combinations of the aspects of the USIT that was discussed in the previous figures. As such, the USIT affects accessing, obtaining and the provision of information, services, transactions, and/or the like across various communications networks. The features and embodiments of the USIT discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the USIT's features and facilities, and in many cases reduce the costs, energy consumption/requirements, and extend the life of USIT's underlying infrastructure; this has the added benefit of making the USIT more reliable. Similarly, many of the features and mechanisms are designed to be easier for users to use and access, thereby broadening the audience that may enjoy/employ and exploit the feature sets of the USIT; such ease of use also helps to increase the reliability of the USIT. In addition, the feature sets include heightened security as noted via the Cryptographic components 620, 626, 628 and throughout, making access to the features and data more reliable and secure The USIT transforms backup driver installation request, backup data store request inputs, via USIT components (e.g., CF2CBT, CBF, ACIT), into backup driver installation response, backup data store response outputs.

The USIT component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the USIT server employs a cryptographic server to encrypt and decrypt communications. The USIT component may communicate to and/or with other components in a component collection, including itself, and/or facilities of the like. Most frequently, the USIT component communicates with the USIT database, operating systems, other program components, and/or the like. The USIT may contain, communicate, generate, obtain, and/or provide program component, system, user, and/or data communications, requests, and/or responses.

Distributed USITs

The structure and/or operation of any of the USIT node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the USIT controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for USIT controller and/or USIT component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RAE), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the USIT controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/
accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until
end of message
do {
        $input = "";
        $input = socket_read($client, 1024);
        $data .= $input;
} while($input != "");
// parse data to extract variables
$obj = json_decode($data, true);
// store input data in a database
mysql_connect("201.408.185.132",$DBserver,$password);
// access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments may include:

1. A user space incremental backup apparatus, comprising:
   a memory;
   a component collection in the memory, including:
      a changed file to changed block tracking component;
   a processor disposed in communication with the memory, and configured to issue a plurality of processing instructions from the component collection stored in the memory,
      wherein the processor issues instructions from the changed file to changed block tracking component, stored in the memory, to:
         determine, via at least one processor, by a user space tracking agent, a new most recent activity entry in a file system journal associated with a data volume;
         determine, via at least one processor, by the user space tracking agent, newly changed files on the data volume by processing journal entries between a previous most recent activity entry in the file system journal, as indicated by a last entry marker maintained by the user space tracking agent, and the new most recent activity entry in the file system journal;
         determine, via at least one processor, by the user space tracking agent, changed data blocks associated with the newly changed files on the data volume;
         mark, via at least one processor, by the user space tracking agent, the changed data blocks as changed in a tracking store maintained by the user space tracking agent;
         update, via at least one processor, by the user space tracking agent, the last entry marker maintained by the user space tracking agent to reflect the new most recent activity entry in the file system journal;
         send, via at least one processor, data blocks flagged as changed in the tracking store maintained by the user space tracking agent to a backup device; and
         mark, via at least one processor, by the user space tracking agent, the sent data blocks as unchanged in the tracking store maintained by the user space tracking agent.

2. The apparatus of embodiment 1, wherein the data volume is associated with a non-functional kernel-based changed block tracking backup agent that becomes functional upon an operating system reboot.

3. The apparatus of embodiment 1, further, comprising:
   the processor issues instructions from the changed file to changed block tracking component, stored in the memory, to:
      determine, via at least one processor, a sufficiently large journal history size to track activity on the data volume; and set, via at least one processor, journal history size of the file system journal to the determined journal history size.

4. The apparatus of embodiment 3, wherein the journal history size is determined based on at least one of: number of files on the data volume, size of the data volume, expected utilization of the data volume.

5. The apparatus of embodiment 1, wherein the newly changed files determined by the user space tracking agent are filtered to include files selected for backup and to exclude files not selected for backup.

6. The apparatus of embodiment 1, wherein the instructions to determine changed data blocks associated with a newly changed file further comprise instructions to determine data blocks of the newly changed file that were modified.

7. The apparatus of embodiment 1, wherein the instructions to determine changed data blocks associated with a newly changed file further comprise instructions to determine each data block of the newly changed file.

8. The apparatus of embodiment 1, wherein the instructions to mark a data block as changed further comprise instructions to flag a bit corresponding to the data block in a changed data blocks bitmap maintained by the user space tracking agent.

9. The apparatus of embodiment 8, wherein the instructions to mark the data block as unchanged further comprise instructions to clear the bit corresponding to the data block in the changed data blocks bitmap maintained by the user space tracking agent.

10. The apparatus of embodiment 1, wherein the backup device is at least one of: a local appliance, a remote server, cloud storage.

11. The apparatus of embodiment 1, wherein the instructions to mark the changed data blocks as changed further comprise instructions to:
   determine that there exist changes to file system metadata unreported by the file system journal; and
   mark data blocks associated with the data volume's NTFS master file table as changed in the tracking store.

12. The apparatus of embodiment 1, wherein the instructions to mark the changed data blocks as changed further comprise instructions to:
   determine that there exist file system independent changes unreported by the file system journal;
   analyze supplemental file system transaction logs of the data volume to determine additional changed data blocks; and
   mark the additional changed data blocks as changed in the tracking store.

13. The apparatus of embodiment 2, further, comprising:
   the processor issues instructions from the changed file to changed block tracking component, stored in the memory, to:
      determine, via at least one processor, by the user space tracking agent, that an operating system reboot occurred; and
      transfer, via at least one processor, by the user space tracking agent, control to the kernel-based changed block tracking backup agent.

14. The apparatus of embodiment 13, further, comprising:

the processor issues instructions from the changed file to changed block tracking component, stored in the memory, to:

verify, via at least one processor, by the user space tracking agent, that the kernel-based changed block tracking backup agent is functional for the data volume prior to transferring control to the kernel-based changed block tracking backup agent.

15. The apparatus of embodiment 13, further, comprising:

the processor issues instructions from the changed file to changed block tracking component, stored in the memory, to:

transfer, via at least one processor, information regarding changed data blocks recorded in the tracking store maintained by the user space tracking agent to a tracking store maintained by the kernel-based changed block tracking backup agent.

16. A processor-readable user space incremental backup non-transient physical medium storing processor-executable components, the components, comprising:

a component collection stored in the medium, including:

a changed file to changed block tracking component;

wherein the changed file to changed block tracking component, stored in the medium, includes processor-issuable instructions to:

determine, via at least one processor, by a user space tracking agent, a new most recent activity entry in a file system journal associated with a data volume;

determine, via at least one processor, by the user space tracking agent, newly changed files on the data volume by processing journal entries between a previous most recent activity entry in the file system journal, as indicated by a last entry marker maintained by the user space tracking agent, and the new most recent activity entry in the file system journal;

determine, via at least one processor, by the user space tracking agent, changed data blocks associated with the newly changed files on the data volume;

mark, via at least one processor, by the user space tracking agent, the changed data blocks as changed in a tracking store maintained by the user space tracking agent;

update, via at least one processor, by the user space tracking agent, the last entry marker maintained by the user space tracking agent to reflect the new most recent activity entry in the file system journal;

send, via at least one processor, data blocks flagged as changed in the tracking store maintained by the user space tracking agent to a backup device; and mark, via at least one processor, by the user space tracking agent, the sent data blocks as unchanged in the tracking store maintained by the user space tracking agent.

17. The medium of embodiment 16, wherein the data volume is associated with a non-functional kernel-based changed block tracking backup agent that becomes functional upon an operating system reboot.

18. The medium of embodiment 16, further, comprising:

the changed file to changed block tracking component, stored in the medium, includes processor-issuable instructions to:

determine, via at least one processor, a sufficiently large journal history size to track activity on the data volume; and set, via at least one processor, journal history size of the file system journal to the determined journal history size.

19. The medium of embodiment 18, wherein the journal history size is determined based on at least one of: number of files on the data volume, size of the data volume, expected utilization of the data volume.

20. The medium of embodiment 16, wherein the newly changed files determined by the user space tracking agent are filtered to include files selected for backup and to exclude files not selected for backup.

21. The medium of embodiment 16, wherein the instructions to determine changed data blocks associated with a newly changed file further comprise instructions to determine data blocks of the newly changed file that were modified.

22. The medium of embodiment 16, wherein the instructions to determine changed data blocks associated with a newly changed file further comprise instructions to determine each data block of the newly changed file.

23. The medium of embodiment 16, wherein the instructions to mark a data block as changed further comprise instructions to flag a bit corresponding to the data block in a changed data blocks bitmap maintained by the user space tracking agent.

24. The medium of embodiment 23, wherein the instructions to mark the data block as unchanged further comprise instructions to clear the bit corresponding to the data block in the changed data blocks bitmap maintained by the user space tracking agent.

25. The medium of embodiment 16, wherein the backup device is at least one of: a local appliance, a remote server, cloud storage.

26. The medium of embodiment 16, wherein the instructions to mark the changed data blocks as changed further comprise instructions to:

determine that there exist changes to file system metadata unreported by the file system journal; and mark data blocks associated with the data volume's NTFS master file table as changed in the tracking store.

27. The medium of embodiment 16, wherein the instructions to mark the changed data blocks as changed further comprise instructions to:

determine that there exist file system independent changes unreported by the file system journal;

analyze supplemental file system transaction logs of the data volume to determine additional changed data blocks; and mark the additional changed data blocks as changed in the tracking store.

28. The medium of embodiment 17, further, comprising:

the changed file to changed block tracking component, stored in the medium, includes processor-issuable instructions to:

determine, via at least one processor, by the user space tracking agent, that an operating system reboot occurred; and transfer, via at least one processor, by the user space tracking agent, control to the kernel-based changed block tracking backup agent.

29. The medium of embodiment 28, further, comprising:
the changed file to changed block tracking component, stored in the medium, includes processor-issuable instructions to:
verify, via at least one processor, by the user space tracking agent, that the kernel-based changed block tracking backup agent is functional for the data volume prior to transferring control to the kernel-based changed block tracking backup agent.

30. The medium of embodiment 28, further, comprising: the changed file to changed block tracking component, stored in the medium, includes processor-issuable instructions to:
transfer, via at least one processor, information regarding changed data blocks recorded in the tracking store maintained by the user space tracking agent to a tracking store maintained by the kernel-based changed block tracking backup agent.

31. A processor-implemented user space incremental backup system, comprising:
a changed file to changed block tracking component means, to:
determine, via at least one processor, by a user space tracking agent, a new most recent activity entry in a file system journal associated with a data volume;
determine, via at least one processor, by the user space tracking agent, newly changed files on the data volume by processing journal entries between a previous most recent activity entry in the file system journal, as indicated by a last entry marker maintained by the user space tracking agent, and the new most recent activity entry in the file system journal;
determine, via at least one processor, by the user space tracking agent, changed data blocks associated with the newly changed files on the data volume;
mark, via at least one processor, by the user space tracking agent, the changed data blocks as changed in a tracking store maintained by the user space tracking agent;
update, via at least one processor, by the user space tracking agent, the last entry marker maintained by the user space tracking agent to reflect the new most recent activity entry in the file system journal;
send, via at least one processor, data blocks flagged as changed in the tracking store maintained by the user space tracking agent to a backup device; and
mark, via at least one processor, by the user space tracking agent, the sent data blocks as unchanged in the tracking store maintained by the user space tracking agent.

32. The system of embodiment 31, wherein the data volume is associated with a non-functional kernel-based changed block tracking backup agent that becomes functional upon an operating system reboot.

33. The system of embodiment 31, further, comprising:
the changed file to changed block tracking component means, to:
determine, via at least one processor, a sufficiently large journal history size to track activity on the data volume; and
set, via at least one processor, journal history size of the file system journal to the determined journal history size.

34. The system of embodiment 33, wherein the journal history size is determined based on at least one of: number of files on the data volume, size of the data volume, expected utilization of the data volume.

35. The system of embodiment 31, wherein the newly changed files determined by the user space tracking agent are filtered to include files selected for backup and to exclude files not selected for backup.

36. The system of embodiment 31, wherein the means to determine changed data blocks associated with a newly changed file further comprise means to determine data blocks of the newly changed file that were modified.

37. The system of embodiment 31, wherein the means to determine changed data blocks associated with a newly changed file further comprise means to determine each data block of the newly changed file.

38. The system of embodiment 31, wherein the means to mark a data block as changed further comprise means to flag a bit corresponding to the data block in a changed data blocks bitmap maintained by the user space tracking agent.

39. The system of embodiment 38, wherein the means to mark the data block as unchanged further comprise means to clear the bit corresponding to the data block in the changed data blocks bitmap maintained by the user space tracking agent.

40. The system of embodiment 31, wherein the backup device is at least one of: a local appliance, a remote server, cloud storage.

41. The system of embodiment 31, wherein the means to mark the changed data blocks as changed further comprise means to:
determine that there exist changes to file system metadata unreported by the file system journal; and
mark data blocks associated with the data volume's NTFS master file table as changed in the tracking store.

42. The system of embodiment 31, wherein the means to mark the changed data blocks as changed further comprise means to:
determine that there exist file system independent changes unreported by the file system journal;
analyze supplemental file system transaction logs of the data volume to determine additional changed data blocks; and
mark the additional changed data blocks as changed in the tracking store.

43. The system of embodiment 32, further, comprising:
the changed file to changed block tracking component means, to:
determine, via at least one processor, by the user space tracking agent, that an operating system reboot occurred; and
transfer, via at least one processor, by the user space tracking agent, control to the kernel-based changed block tracking backup agent.

44. The system of embodiment 43, further, comprising:
the changed file to changed block tracking component means, to:
verify, via at least one processor, by the user space tracking agent, that the kernel-based changed block tracking backup agent is functional for the data volume prior to transferring control to the kernel-based changed block tracking backup agent.

45. The system of embodiment 43, further, comprising:
the changed file to changed block tracking component means, to:
transfer, via at least one processor, information regarding changed data blocks recorded in the tracking store maintained by the user space tracking agent to a tracking store maintained by the kernel-based changed block tracking backup agent.

46. A processor-implemented user space incremental backup method, comprising:
executing processor-implemented changed file to changed block tracking component instructions to:
determine, via at least one processor, by a user space tracking agent, a new most recent activity entry in a file system journal associated with a data volume;
determine, via at least one processor, by the user space tracking agent, newly changed files on the data volume by processing journal entries between a previous most recent activity entry in the file system journal, as indicated by a last entry marker maintained by the user space tracking agent, and the new most recent activity entry in the file system journal;
determine, via at least one processor, by the user space tracking agent, changed data blocks associated with the newly changed files on the data volume;
mark, via at least one processor, by the user space tracking agent, the changed data blocks as changed in a tracking store maintained by the user space tracking agent;
update, via at least one processor, by the user space tracking agent, the last entry marker maintained by the user space tracking agent to reflect the new most recent activity entry in the file system journal;
send, via at least one processor, data blocks flagged as changed in the tracking store maintained by the user space tracking agent to a backup device; and
mark, via at least one processor, by the user space tracking agent, the sent data blocks as unchanged in the tracking store maintained by the user space tracking agent.

47. The method of embodiment 46, wherein the data volume is associated with a non-functional kernel-based changed block tracking backup agent that becomes functional upon an operating system reboot.

48. The method of embodiment 46, further, comprising:
executing processor-implemented changed file to changed block tracking component instructions to:
determine, via at least one processor, a sufficiently large journal history size to track activity on the data volume; and
set, via at least one processor, journal history size of the file system journal to the determined journal history size.

49. The method of embodiment 48, wherein the journal history size is determined based on at least one of: number of files on the data volume, size of the data volume, expected utilization of the data volume.

50. The method of embodiment 46, wherein the newly changed files determined by the user space tracking agent are filtered to include files selected for backup and to exclude files not selected for backup.

51. The method of embodiment 46, wherein the instructions to determine changed data blocks associated with a newly changed file further comprise instructions to determine data blocks of the newly changed file that were modified.

52. The method of embodiment 46, wherein the instructions to determine changed data blocks associated with a newly changed file further comprise instructions to determine each data block of the newly changed file.

53. The method of embodiment 46, wherein the instructions to mark a data block as changed further comprise instructions to flag a bit corresponding to the data block in a changed data blocks bitmap maintained by the user space tracking agent.

54. The method of embodiment 53, wherein the instructions to mark the data block as unchanged further comprise instructions to clear the bit corresponding to the data block in the changed data blocks bitmap maintained by the user space tracking agent.

55. The method of embodiment 46, wherein the backup device is at least one of: a local appliance, a remote server, cloud storage.

56. The method of embodiment 46, wherein the instructions to mark the changed data blocks as changed further comprise instructions to:
determine that there exist changes to file system metadata unreported by the file system journal; and
mark data blocks associated with the data volume's NTFS master file table as changed in the tracking store.

57. The method of embodiment 46, wherein the instructions to mark the changed data blocks as changed further comprise instructions to:
determine that there exist file system independent changes unreported by the file system journal;
analyze supplemental file system transaction logs of the data volume to determine additional changed data blocks; and
mark the additional changed data blocks as changed in the tracking store.

58. The method of embodiment 47, further, comprising:
executing processor-implemented changed file to changed block tracking component instructions to:
determine, via at least one processor, by the user space tracking agent, that an operating system reboot occurred; and
transfer, via at least one processor, by the user space tracking agent, control to the kernel-based changed block tracking backup agent.

59. The method of embodiment 58, further, comprising:
executing processor-implemented changed file to changed block tracking component instructions to:
verify, via at least one processor, by the user space tracking agent, that the kernel-based changed block tracking backup agent is functional for the data volume prior to transferring control to the kernel-based changed block tracking backup agent.

60. The method of embodiment 58, further, comprising:
executing processor-implemented changed file to changed block tracking component instructions to:
transfer, via at least one processor, information regarding changed data blocks recorded in the tracking store maintained by the user space tracking agent to a tracking store maintained by the kernel-based changed block tracking backup agent.

In order to address various issues and advance the art, the entirety of this application for User Space Incremental Tracking Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a USIT individual and/or enterprise user, database configuration and/or relational model, data type, data transmission and/or network framework, syntax structure, and/or the like, various embodiments of the USIT, may be implemented that allow a great deal of flexibility and customization. For example, aspects of the USIT may be adapted for storage management systems. While various embodiments and discussions of the USIT have included backup systems, however, it is to be understood that the embodiments described herein may be readily configured and/or customized for a wide variety of other applications and/or implementations.

What is claimed is:

1. A user space incremental backup apparatus, comprising:
   a memory;
   a component collection in the memory, including:
      a changed file to changed block tracking component;
   a processor disposed in communication with the memory, and configured to issue a plurality of processing instructions from the component collection stored in the memory,
      wherein the processor issues instructions from the changed file to changed block tracking component, stored in the memory, to:
         determine, via at least one processor, by a user space tracking agent, a new most recent activity entry in a file system journal associated with a data volume;
         determine, via at least one processor, by the user space tracking agent, newly changed files on the data volume by processing journal entries between a previous most recent activity entry in the file system journal, as indicated by a last entry marker maintained by the user space tracking agent, and the new most recent activity entry in the file system journal;
         determine, via at least one processor, by the user space tracking agent, changed data blocks associated with the newly changed files on the data volume;
         mark, via at least one processor, by the user space tracking agent, the changed data blocks as changed in a tracking store maintained by the user space tracking agent;
         update, via at least one processor, by the user space tracking agent, the last entry marker maintained by the user space tracking agent to reflect the new most recent activity entry in the file system journal;
         send, via at least one processor, data blocks flagged as changed in the tracking store maintained by the user space tracking agent to a backup device; and
         mark, via at least one processor, by the user space tracking agent, the sent data blocks as unchanged in the tracking store maintained by the user space tracking agent.

2. The apparatus of claim 1, wherein the data volume is associated with a non-functional kernel-based changed block tracking backup agent that becomes functional upon an operating system reboot.

3. The apparatus of claim 1, further, comprising:
   the processor issues instructions from the changed file to changed block tracking component, stored in the memory, to:
      determine, via at least one processor, a sufficiently large journal history size to track activity on the data volume; and set, via at least one processor, journal history size of the file system journal to the determined journal history size.

4. The apparatus of claim 3, wherein the journal history size is determined based on at least one of: number of files on the data volume, size of the data volume, expected utilization of the data volume.

5. The apparatus of claim 1, wherein the newly changed files determined by the user space tracking agent are filtered to include files selected for backup and to exclude files not selected for backup.

6. The apparatus of claim 1, wherein the instructions to determine changed data blocks associated with a newly changed file further comprise instructions to determine data blocks of the newly changed file that were modified.

7. The apparatus of claim 1, wherein the instructions to determine changed data blocks associated with a newly changed file further comprise instructions to determine each data block of the newly changed file.

8. The apparatus of claim 1, wherein the instructions to mark a data block as changed further comprise instructions to flag a bit corresponding to the data block in a changed data blocks bitmap maintained by the user space tracking agent.

9. The apparatus of claim 8, wherein the instructions to mark the data block as unchanged further comprise instructions to clear the bit corresponding to the data block in the changed data blocks bitmap maintained by the user space tracking agent.

10. The apparatus of claim 1, wherein the backup device is at least one of: a local appliance, a remote server, cloud storage.

11. The apparatus of claim 1, wherein the instructions to mark the changed data blocks as changed further comprise instructions to:
determine that there exist changes to file system metadata unreported by the file system journal; and
mark data blocks associated with the data volume's NTFS master file table as changed in the tracking store.

12. The apparatus of claim 1, wherein the instructions to mark the changed data blocks as changed further comprise instructions to:
determine that there exist file system independent changes unreported by the file system journal;
analyze supplemental file system transaction logs of the data volume to determine additional changed data blocks; and
mark the additional changed data blocks as changed in the tracking store.

13. The apparatus of claim 2, further, comprising:
the processor issues instructions from the changed file to changed block tracking component, stored in the memory, to:
determine, via at least one processor, by the user space tracking agent, that an operating system reboot occurred; and
transfer, via at least one processor, by the user space tracking agent, control to the kernel-based changed block tracking backup agent.

14. The apparatus of claim 13, further, comprising:
the processor issues instructions from the changed file to changed block tracking component, stored in the memory, to:
verify, via at least one processor, by the user space tracking agent, that the kernel-based changed block tracking backup agent is functional for the data volume prior to transferring control to the kernel-based changed block tracking backup agent.

15. The apparatus of claim 13, further, comprising:
the processor issues instructions from the changed file to changed block tracking component, stored in the memory, to:
transfer, via at least one processor, information regarding changed data blocks recorded in the tracking store maintained by the user space tracking agent to a tracking store maintained by the kernel-based changed block tracking backup agent.

16. A processor-readable user space incremental backup non-transient physical medium storing processor-executable components, the components, comprising:
a component collection stored in the medium, including:
a changed file to changed block tracking component;
wherein the changed file to changed block tracking component, stored in the medium, includes processor-issuable instructions to:
determine, via at least one processor, by a user space tracking agent, a new most recent activity entry in a file system journal associated with a data volume;
determine, via at least one processor, by the user space tracking agent, newly changed files on the data volume by processing journal entries between a previous most recent activity entry in the file system journal, as indicated by a last entry marker maintained by the user space tracking agent, and the new most recent activity entry in the file system journal;
determine, via at least one processor, by the user space tracking agent, changed data blocks associated with the newly changed files on the data volume;
mark, via at least one processor, by the user space tracking agent, the changed data blocks as changed in a tracking store maintained by the user space tracking agent;
update, via at least one processor, by the user space tracking agent, the last entry marker maintained by the user space tracking agent to reflect the new most recent activity entry in the file system journal;
send, via at least one processor, data blocks flagged as changed in the tracking store maintained by the user space tracking agent to a backup device; and
mark, via at least one processor, by the user space tracking agent, the sent data blocks as unchanged in the tracking store maintained by the user space tracking agent.

17. A processor-implemented user space incremental backup system, comprising:
a changed file to changed block tracking component means, to:
determine, via at least one processor, by a user space tracking agent, a new most recent activity entry in a file system journal associated with a data volume;
determine, via at least one processor, by the user space tracking agent, newly changed files on the data volume by processing journal entries between a previous most recent activity entry in the file system journal, as indicated by a last entry marker maintained by the user space tracking agent, and the new most recent activity entry in the file system journal;
determine, via at least one processor, by the user space tracking agent, changed data blocks associated with the newly changed files on the data volume;

mark, via at least one processor, by the user space tracking agent, the changed data blocks as changed in a tracking store maintained by the user space tracking agent;

update, via at least one processor, by the user space tracking agent, the last entry marker maintained by the user space tracking agent to reflect the new most recent activity entry in the file system journal; and send, via at least one processor, data blocks flagged as changed in the tracking store maintained by the user space tracking agent to a backup device.

18. A processor-implemented user space incremental backup method, comprising:

executing processor-implemented changed file to changed block tracking component instructions to:

determine, via at least one processor, by a user space tracking agent, a new most recent activity entry in a file system journal associated with a data volume;

determine, via at least one processor, by the user space tracking agent, newly changed files on the data volume by processing journal entries between a previous most recent activity entry in the file system journal, as indicated by a last entry marker maintained by the user space tracking agent, and the new most recent activity entry in the file system journal;

determine, via at least one processor, by the user space tracking agent, changed data blocks associated with the newly changed files on the data volume;

mark, via at least one processor, by the user space tracking agent, the changed data blocks as changed in a tracking store maintained by the user space tracking agent;

update, via at least one processor, by the user space tracking agent, the last entry marker maintained by the user space tracking agent to reflect the new most recent activity entry in the file system journal;

send, via at least one processor, data blocks flagged as changed in the tracking store maintained by the user space tracking agent to a backup device; and mark, via at least one processor, by the user space tracking agent, the sent data blocks as unchanged in the tracking store maintained by the user space tracking agent.

19. The method of claim 18, wherein the data volume is associated with a non-functional kernel-based changed block tracking backup agent that becomes functional upon an operating system reboot.

20. The method of claim 18, further, comprising:

executing processor-implemented changed file to changed block tracking component instructions to:

determine, via at least one processor, a sufficiently large journal history size to track activity on the data volume; and set, via at least one processor, journal history size of the file system journal to the determined journal history size.

21. The method of claim 19, further, comprising:

executing processor-implemented changed file to changed block tracking component instructions to:

determine, via at least one processor, by the user space tracking agent, that an operating system reboot occurred; and transfer, via at least one processor, by the user space tracking agent, control to the kernel-based changed block tracking backup agent.

22. The method of claim 21, further, comprising:

executing processor-implemented changed file to changed block tracking component instructions to:

transfer, via at least one processor, information regarding changed data blocks recorded in the tracking store maintained by the user space tracking agent to a tracking store maintained by the kernel-based changed block tracking backup agent.

\* \* \* \* \*